US012555431B2

(12) United States Patent
Ramsey

(10) Patent No.: US 12,555,431 B2
(45) Date of Patent: Feb. 17, 2026

(54) CAMERA EQUIPPED CONTROLLER DEVICE

(71) Applicant: Tanner Ramsey, Mesquite, TX (US)

(72) Inventor: Tanner Ramsey, Mesquite, TX (US)

( * ) Notice: Subject to any disclaimer, the term of this patent is extended or adjusted under 35 U.S.C. 154(b) by 243 days.

(21) Appl. No.: 18/375,185

(22) Filed: Sep. 29, 2023

(65) Prior Publication Data

US 2025/0111717 A1 Apr. 3, 2025

(51) Int. Cl.
*G07C 9/00* (2020.01)
*G07C 9/10* (2020.01)
*G07C 9/20* (2020.01)
*H04N 7/18* (2006.01)

(52) U.S. Cl.
CPC ........... *G07C 9/00817* (2013.01); *G07C 9/10* (2020.01); *G07C 9/20* (2020.01); *H04N 7/183* (2013.01); *G07C 2009/00769* (2013.01); *G07C 2009/00825* (2013.01)

(58) Field of Classification Search
CPC ........ G07C 9/00817; G07C 9/20; G07C 9/10; G07C 2009/00769; G07C 2009/00825; H04N 7/183
See application file for complete search history.

(56) References Cited

U.S. PATENT DOCUMENTS

D381,962 S 8/1997 Doppelt
9,405,360 B2 8/2016 Ang
9,879,466 B1 1/2018 Yu
10,257,473 B2 4/2019 Hu
11,443,517 B1 9/2022 Kalagher
D968,254 S 11/2022 Qin
2016/0258202 A1* 9/2016 Scalisi ..................... G07C 9/20
2017/0330433 A1 11/2017 Zhu
2018/0263129 A1* 9/2018 Whitmire ................ E05F 15/60
2019/0325681 A1 10/2019 Bresson
2020/0275546 A1* 8/2020 Marshal ............. H05B 47/1975
2021/0407237 A1 12/2021 Khalid
2022/0200191 A1* 6/2022 Martin ................... H01R 13/70

FOREIGN PATENT DOCUMENTS

WO WO2019201985 10/2019

* cited by examiner

*Primary Examiner* — Sisay Yacob

(57) ABSTRACT

A camera equipped controller device for manual or remote actuation of a garage door opener includes a controller, which can be attached to a wall in a garage and wiredly engaged to a garage door opener for a garage door of the garage. The controller can communicate wirelessly with an electronic device of a user. The controller comprises a manual switch, which can be switched to actuate the garage door, and a camera, which can capture an image of a space defined by the garage. Also included is programming code, which is selectively positionable on the electronic device and which enables the electronic device to receive and to selectively present a status of the garage door and the image captured by the camera. The programming code also enables wireless control of the garage door opener via the controller.

13 Claims, 8 Drawing Sheets

CAMERA EQUIPPED CONTROLLER DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to controller devices and more particularly pertains to a new controller device for manual or remote actuation of a garage door opener. Remote monitoring of a garage and its contents and remote control of garage doors are desirable functions for a controller device for a garage door opener.

(2) Description of Related Art Including Information Disclosed Under 37 CFR 1.97 and 1.9

The prior art relates to controller devices. Prior art controller devices typically lack cameras and do not include a manual switch that allows them to replace existing controls for garage door openers.

BRIEF SUMMARY OF THE INVENTION

An embodiment of the disclosure meets the needs presented above by generally comprising a controller, which is configured to be attached to a wall in a garage, to be wiredly engaged to a garage door opener for a garage door of the garage, and to communicate wirelessly with an electronic device of a user. The controller comprises a manual switch and a camera, which are configured, respectively, to be switched to actuate the garage door and to capture an image of a space defined by the garage. Also included is programming code, which is selectively positionable on the electronic device and which enables the electronic device to receive and to selectively present a status of the garage door and the image captured by the camera. The programming code also enables wireless control of the garage door opener via the controller.

Another embodiment of the disclosure includes a camera equipped controller system, which comprises a garage having a controller, as per the disclosure above, attached to one of its walls. The controller is wiredly engaged to a garage door opener for a garage door of the garage and is configured for wireless communication. The controller comprises a manual switch and a camera, which are configured, respectively, to be switched to actuate the garage door and to capture an image of a space defined by the garage. The system also includes an electronic device having positioned thereon programming code enabling the electronic device to receive and to selectively present a status of the garage door and the image captured by the camera, the programming code enabling wireless control of the garage door opener via the controller.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

(i) BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
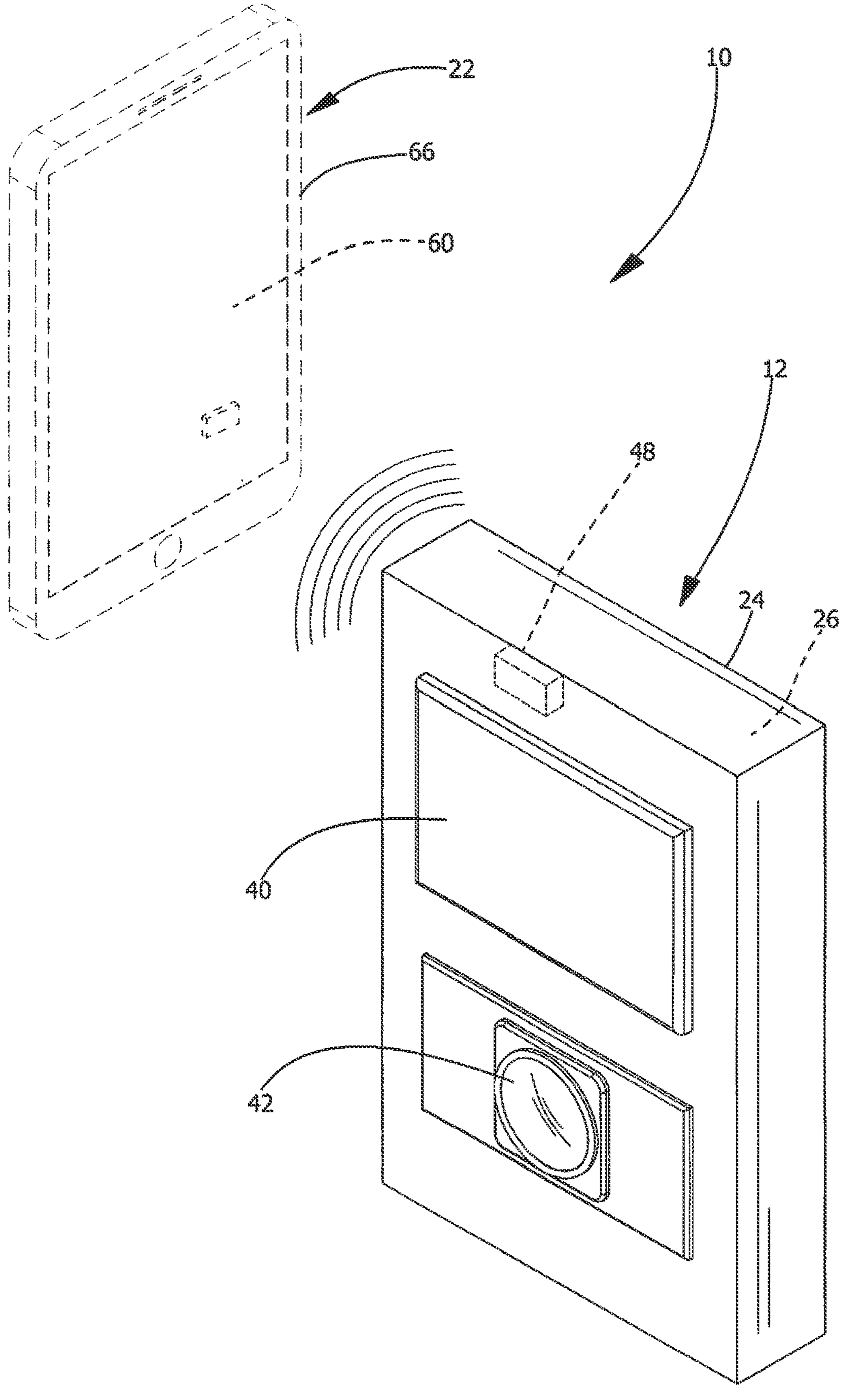
FIG. 1 is a front isometric perspective view of a camera equipped controller device according to an embodiment of the disclosure.

With reference now to the drawings, and in particular to FIGS. 1 through 8 thereof, a new controller device embodying the principles and concepts of an embodiment of the disclosure and generally designated by the reference numeral 10 will be described.

As best illustrated in FIGS. 1 through 8, the camera equipped controller device 10 generally comprises a controller 12, which is configured to be attached to a wall 14 in a garage 16, to be wiredly engaged to a garage door opener 18 for a garage door 20 of the garage 16, and to communicate wirelessly with an electronic device 22 of a user.

The controller 12 comprises a housing 24, which defines an interior space 26. A coupler 28 is attached to a rear 30 of the housing 24 and is configured to attach the housing 24 to the wall 14. The coupler 28 may comprise a pair of hangers 32, with each hanger 32 being configured to engage a head 34 of a respective mounting screw 36 that extends from the wall 14. The present invention also anticipates the coupler 28 comprising other coupling means, such as, but not limited to, adhesives, a set of mounting holes positioned in the back of the housing 24, with each mounting hole being configured for insertion of a respective article of mounting hardware to attach the housing 24 to the wall 14.

A microprocessor 38 is attached to the housing 24 and is positioned in the interior space 26. A manual switch 40 and a camera 42 are attached to the housing 24 and are operationally engaged to the microprocessor 38. The manual switch 40 is configured to be switched to signal the microprocessor 38 to actuate the garage door opener 18. In this respect, the manual switch 40 fulfills the function of standard wired control for garage door opener 18. The manual switch 40 is spring loaded and selectively depressible.

The camera 42 is configured to capture an image of a space that is defined by the garage 16. Depending on positioning of the housing 24, the image captured by the camera 42 also would include space in front of the garage 16 when the garage door 20 is open. The camera 42 typically would be configured to capture video. The present invention anticipates the camera 42 being configured for one or more of night vision, wide-angle imaging, and capturing of images for display at a high resolution (4 k, 1080p, or the like). Additionally anticipated by the present invention is the camera 42 being motion sensor activated.

Figure 2:
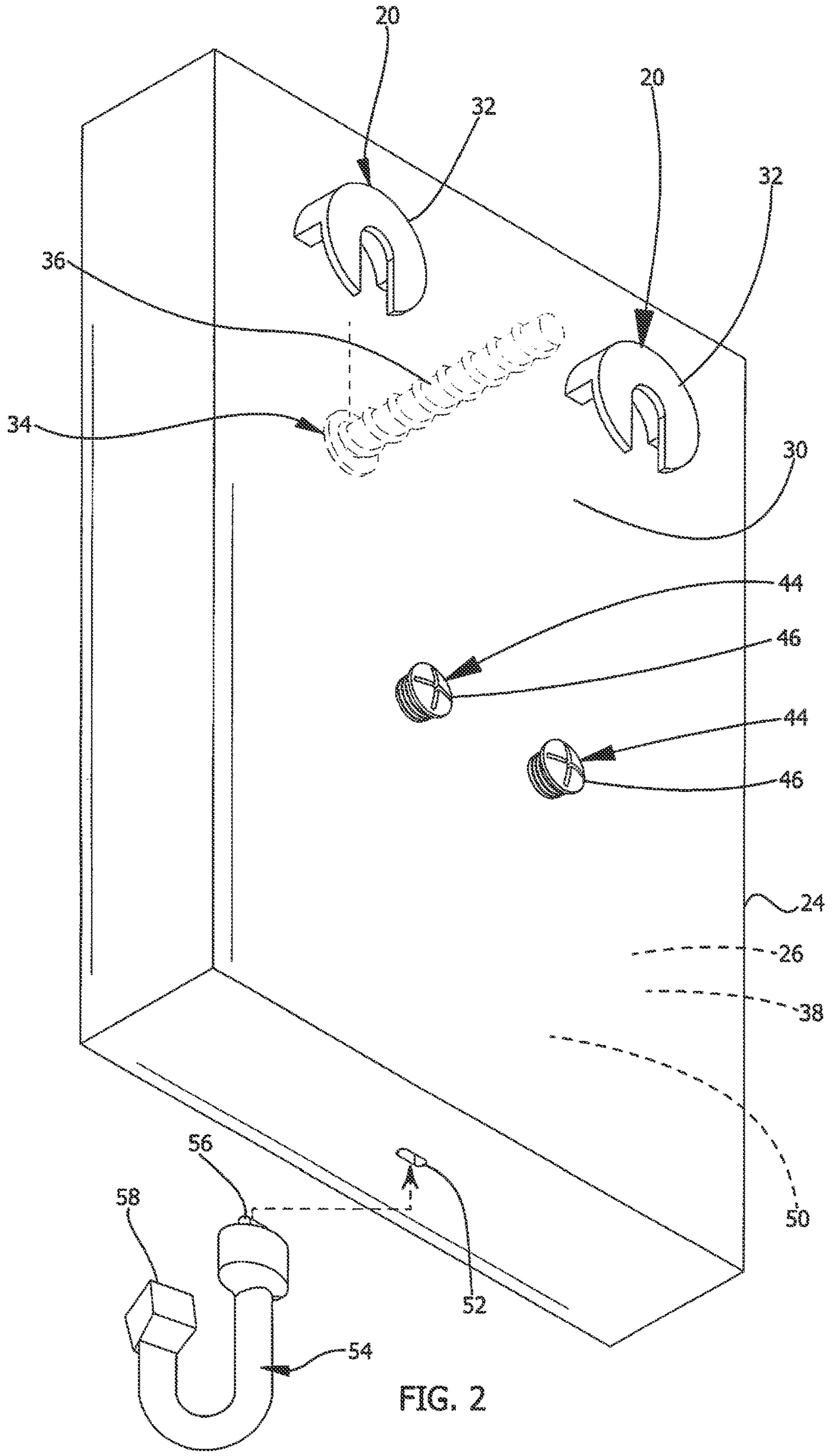
FIG. 2 is a rear isometric perspective view of an embodiment of the disclosure.
Figure 3:
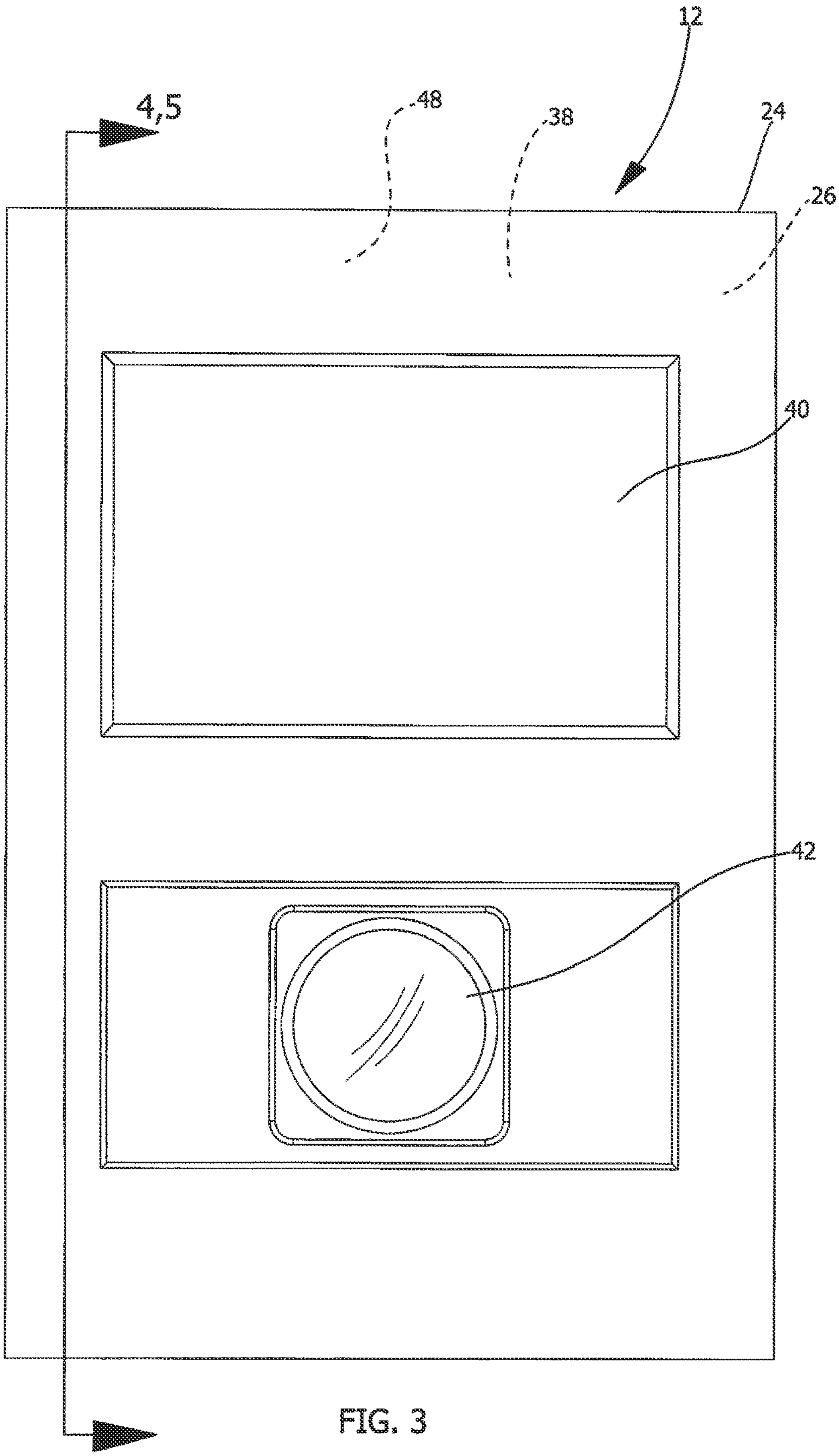
FIG. 3 is a front view of an embodiment of the disclosure.
Figure 4:
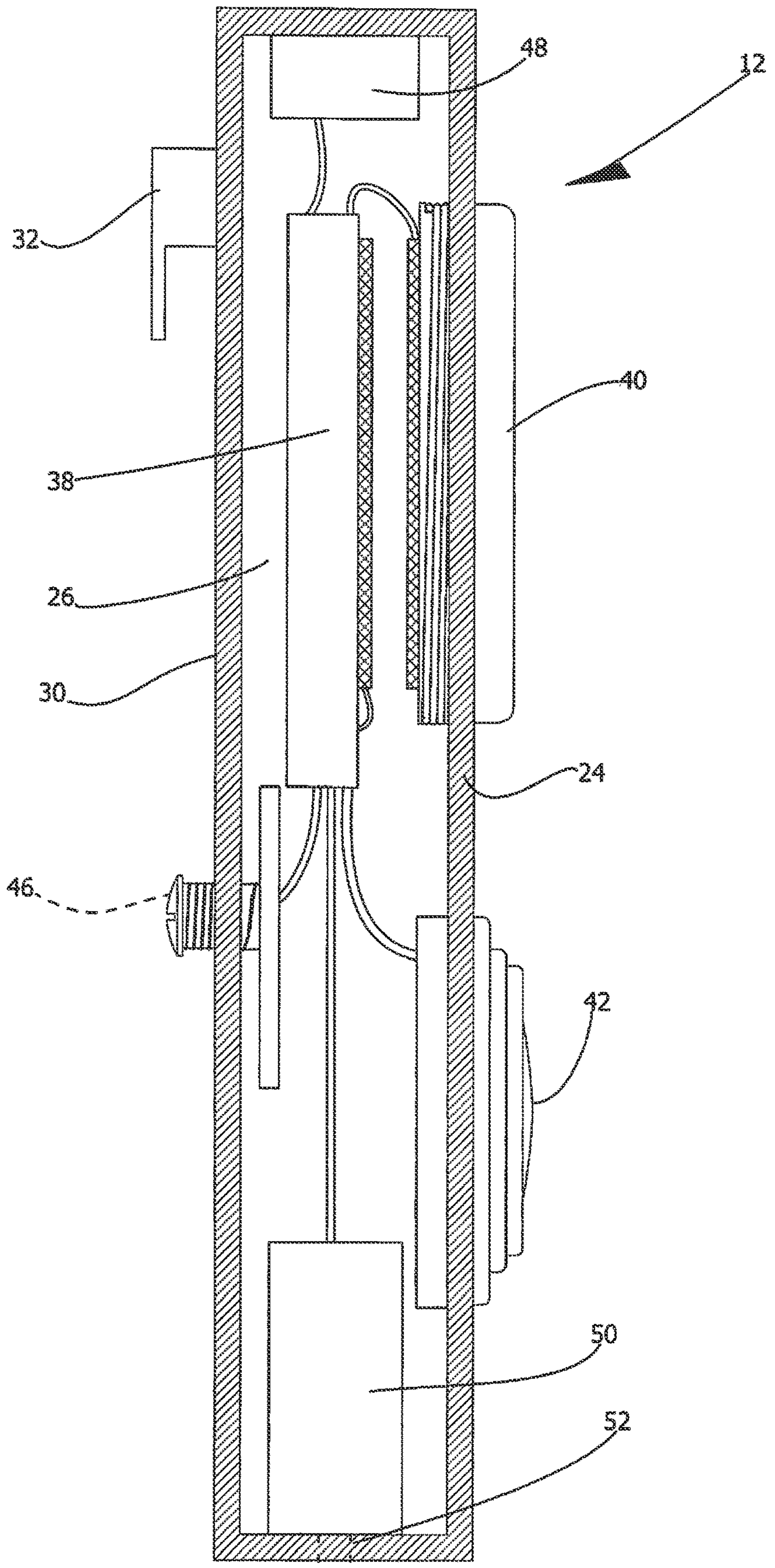
FIG. 4 is a cross-sectional view of an embodiment of the disclosure.
Figure 5:
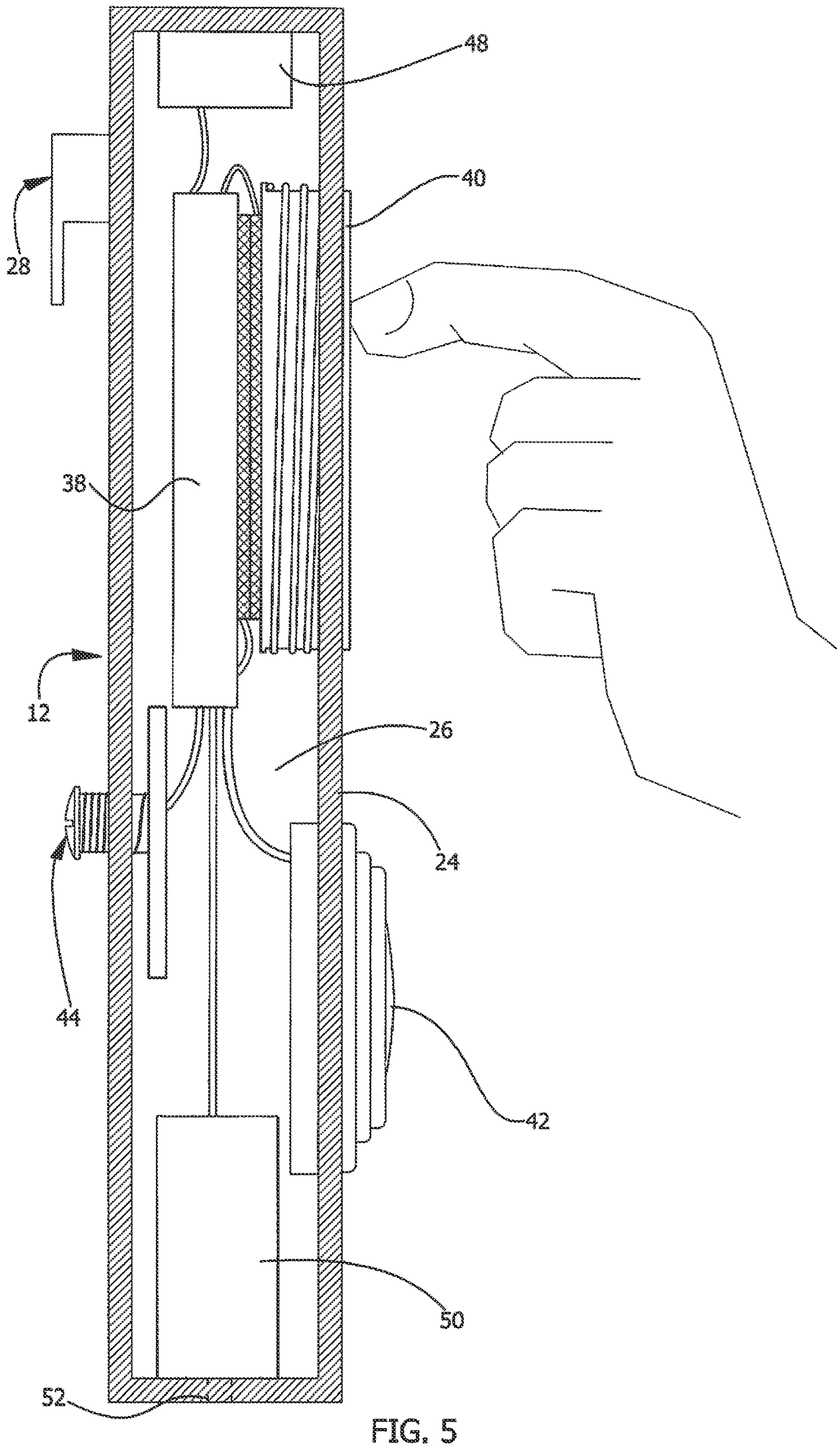
FIG. 5 is a cross-sectional view of an embodiment of the disclosure.
Figure 6:
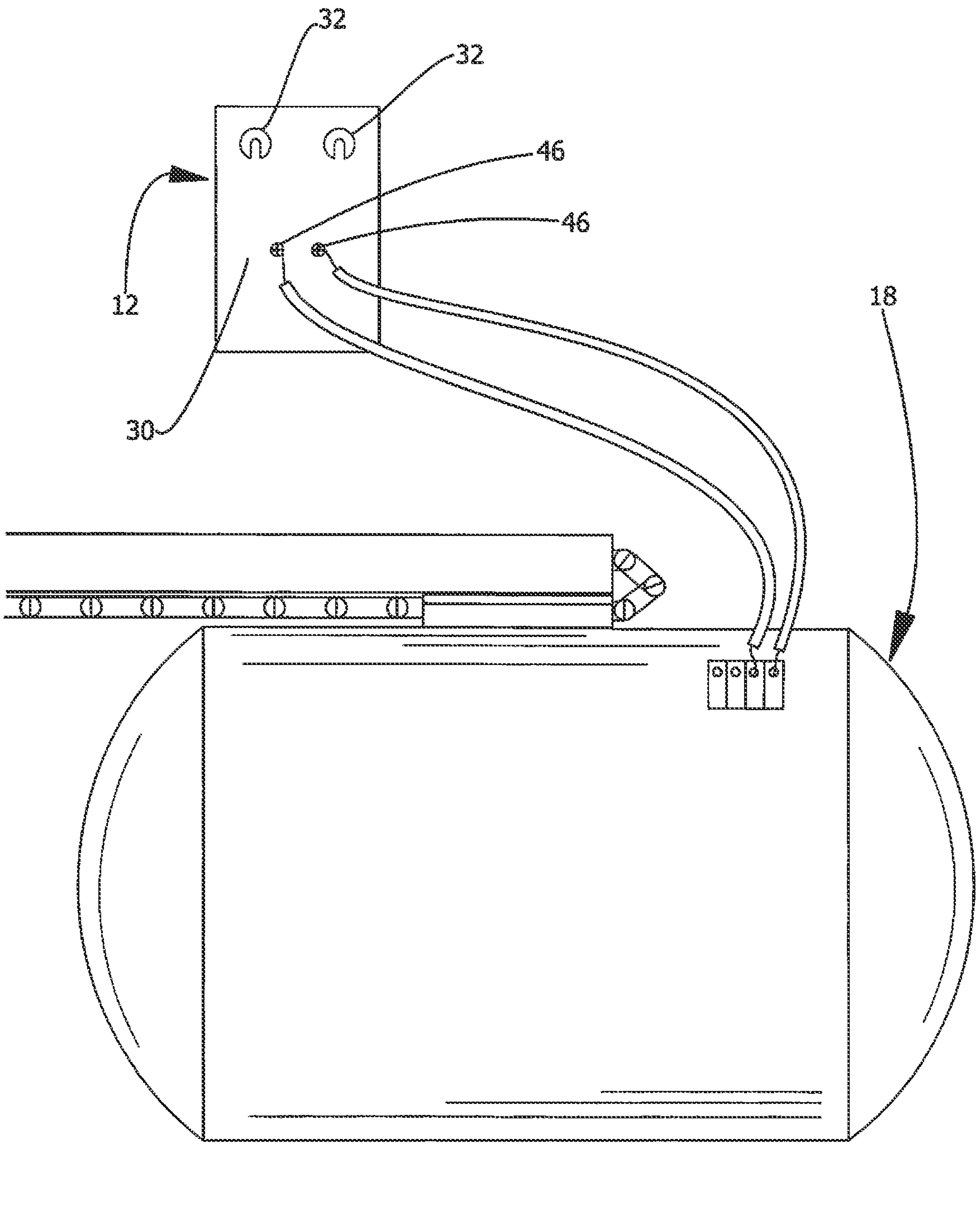
FIG. 6 is a detail view of an embodiment of the disclosure.

A set of connectors 44 is attached to the housing 24, typically to the rear 30 of the housing 24, and is operationally engaged to the microprocessor 38. The connectors 44 are configured to wiredly engage the microprocessor 38 to the garage door opener 18. The set of connectors 44 may comprise a plurality of wire terminals 46, as is shown in FIG. 2, or other connection means, such as, but not limited to, slotted connections, or the like. The present invention anticipates the controller 12 being used in new construction, replacing an existing wired control in the garage 16, or being added as an additional control in the garage 16.

A transceiver 48 is attached to the housing 24, is positioned in the interior space 26, and is operationally engaged to the microprocessor 38. The microprocessor 38 is programmed to selectively actuate the garage door opener 18 upon receipt of a signal from the electronic device 22, via the transceiver 48, to open and to close the garage door 20. The transceiver 48 is anticipated to be configured to connect to a wireless network, but also could be configured to connect to a cellular network, a satellite network, or the like.

The present invention anticipates the controller 12 comprising a microphone, which would be attached to the housing 24 and operationally engaged to the microprocessor 38. The microphone could capture sound within and proximate to the garage 16. With the camera 42 capturing video images, the controller 12 would be enabled to transmit audiovisual signals to the electronic device 22.

A battery 50 is attached to the housing 24, is positioned in the interior space 26, and is operationally engaged to the microprocessor 38. The battery 50 can power the controller 12 in event of a power outage so that the images are transmittable to the electronic device 22 during the power outage. The battery 50 is rechargeable. A port 52 is attached to the housing 24 and is operationally engaged to the microprocessor 38. The camera equipped controller device 10 includes a charging cord 54, which has a first plug 56 that is complementary to the port 52 so that the first plug 56 is selectively insertable into the port 52. A second plug 58 of the charging cord 54 is configured to engage a source of electrical current to recharge the battery 50.

Figure 7:
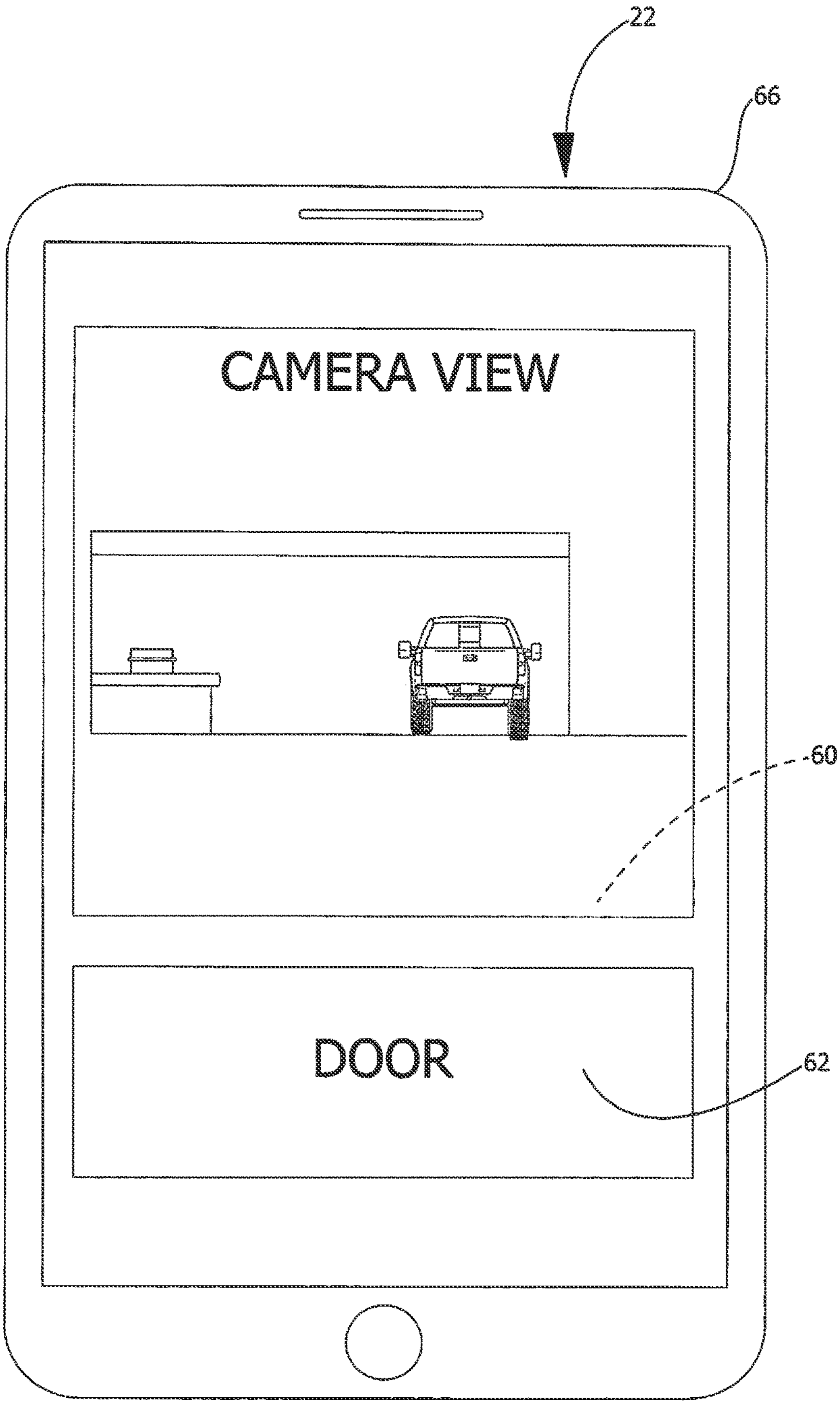
FIG. 7 is a detail view of an embodiment of the disclosure.
Figure 8:
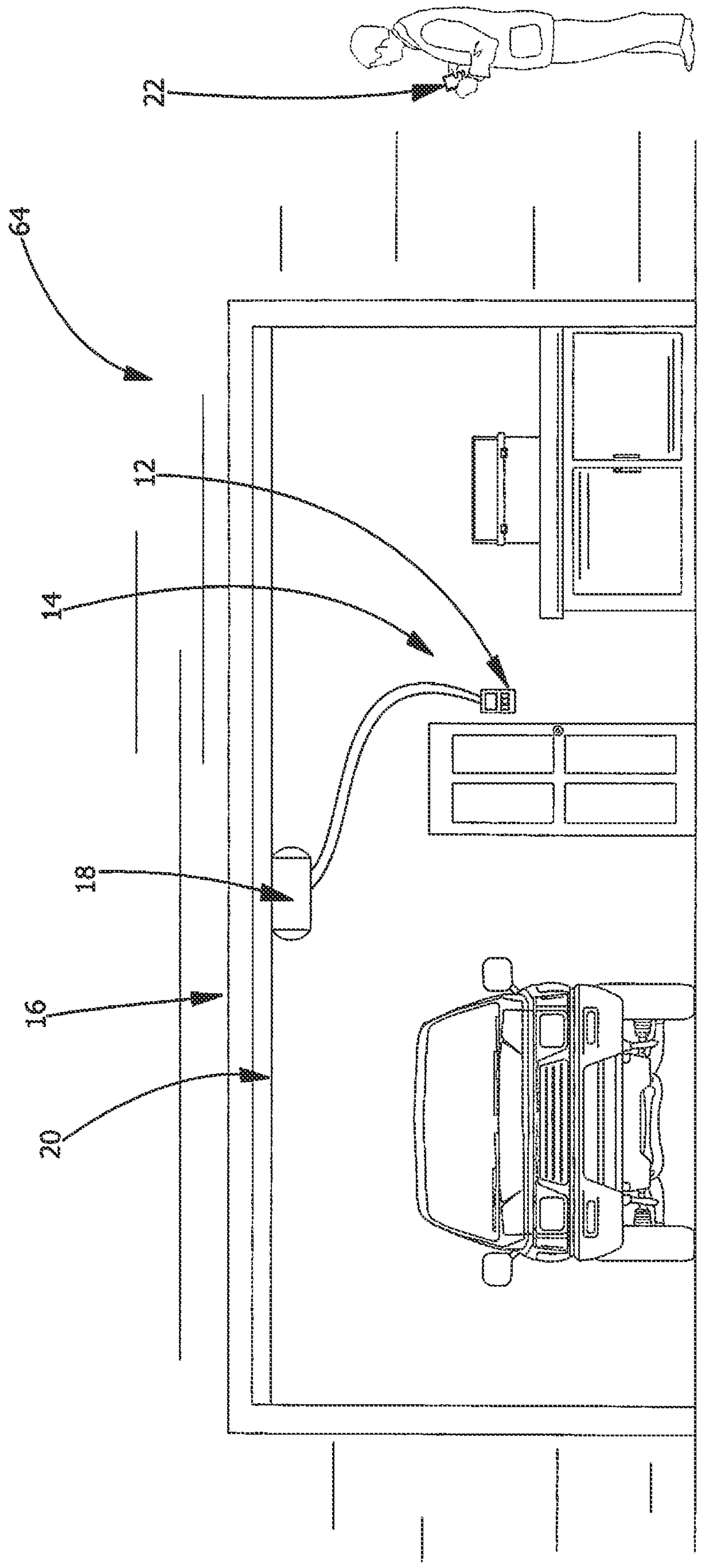
FIG. 8 is an in-use view of an embodiment of the disclosure.

Also included is programming code 60, which is selectively positionable on the electronic device 22 and which enables the electronic device 22 to receive and to selectively present a status of the garage door 20 and the image captured by the camera 42. The programming code 60 also enables wireless control of the garage door opener 18 via the controller 12. As is shown in FIG. 7, the programming code 60 may enable the electronic device 22 to emulate a touch switch 62, which would be touched by the user to open and to close the garage door 20.

The present invention also includes a camera equipped controller system 64, which comprises a garage 16 having a controller 12, as per the specification above, attached to one of its walls 14. The controller 12 is wiredly engaged to a garage door opener 18 for a garage door 20 of the garage 16 and is configured for wireless communication. The controller 12 comprises a manual switch 40 and a camera 42, which are configured, respectively, to be switched to actuate the garage door 20 and to capture an image of a space that is defined by the garage 16. The system also includes an electronic device 22, typically a smartphone 66, having positioned thereon programming code 60 enabling the electronic device 22 to receive and to selectively present a status of the garage door 20 and the image captured by the camera 42. The programming code 60 also enables wireless control of the garage door opener 18, via the controller 12.

In use and by way of example, the controller 12 is mounted in place of an existing wired control and is wired to the garage door opener 18 using existing wiring. The programming code 60 is downloaded to the user's electronic device 22. The user then can view contents and events occurring in the garage 16 on the electronic device 22, can view status of the garage door 20 (open or closed), and can remotely control the garage door opener 18.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A camera equipped controller device comprising:

a controller being configured to be attached to a wall in a garage, to be wiredly engaged to a garage door opener for a garage door of the garage, and to communicate wirelessly with an electronic device of a user, the controller comprising a manual switch and a camera, wherein the manual switch is configured to be switched to actuate the garage door and wherein the camera is configured to capture an image of a space defined by the garage; and programming code selectively positionable on the electronic device enabling the electronic device to receive and to selectively present a status of the garage door and the image captured by the camera, the programming code enabling wireless control of the garage door opener via the controller;

wherein the controller includes a housing defining an interior space;

a coupler attached to a rear of the housing and being configured to attach the housing to the wall, wherein the coupler is a pair of hangers, wherein each hanger of the pair of hangers is an L-shaped extension from the housing having a slotted distal flange relative to the housing wherein each hanger is configured to engage a head of a respective mounting screw extending from the wall;

a microprocessor attached to the housing and positioned in the interior space, the manual switch and the camera being attached to the housing and operationally engaged to the microprocessor, wherein the manual switch is configured to be switched to signal the microprocessor to actuate the garage door opener;

a set of connectors attached to the housing and operationally engaged to the microprocessor, wherein the connectors of the set of connectors are configured to wiredly engage the microprocessor to the garage door opener; and a transceiver attached to the housing, positioned in the interior space, and operationally engaged to the microprocessor, the microprocessor being programmed to selectively actuate the garage door opener upon receipt of a signal from the electronic device to open and to close the garage door.

2. The camera equipped controller device of claim 1, wherein the manual switch is spring loaded and selectively depressible.

3. The camera equipped controller device of claim 1, wherein the camera is configured to capture video.

4. The camera equipped controller device of claim 1, wherein the set of connectors comprises a plurality of wire terminals.

5. The camera equipped controller device of claim 1, further including a battery attached to the housing, positioned in the interior space, and operationally engaged to the microprocessor to power the controller in event of a power outage, such that the video images are transmittable to the electronic device during the power outage.

6. The camera equipped controller device of claim 5, further including:

the battery being rechargeable;

a port attached to the housing and operationally engaged to the microprocessor; and a charging cord having a first plug complementary to the port, such that the first plug is selectively insertable into the port, a second plug of the charging cord being configured to engage a source of electrical current to recharge the battery.

7. A camera equipped controller device comprising:

a controller being configured to be attached to a wall in a garage, to be wiredly engaged to a garage door opener for a garage door of the garage, and to communicate wirelessly with an electronic device of a user, the controller comprising a manual switch and a camera, wherein the manual switch is configured to be switched to actuate the garage door and wherein the camera is configured to capture an image of a space defined by the garage, the controller comprising:

a housing defining an interior space;

a coupler attached to a rear of the housing and being configured to attach the housing to the wall, the coupler comprising a pair of hangers, wherein each hanger of the pair of hangers is an L-shaped extension from the housing having a slotted distal flange relative to the housing wherein each hanger is configured to engage a head of a respective mounting screw extending from the wall;

a microprocessor attached to the housing and positioned in the interior space, the manual switch and the camera being attached to the housing and operationally engaged to the microprocessor, wherein the manual switch is configured to be switched to signal the microprocessor to actuate the garage door opener, the manual switch being spring loaded and selectively depressible, the camera being configured to capture video;

a set of connectors attached to the housing and operationally engaged to the microprocessor, wherein the connectors of the set of connectors are configured to wiredly engage the microprocessor to the garage door opener, the set of connectors comprising a plurality of wire terminals;

a transceiver attached to the housing, positioned in the interior space, and operationally engaged to the microprocessor, the microprocessor being programmed to selectively actuate the garage door opener upon receipt of a signal from the electronic device to open and to close the garage door;

a battery attached to the housing, positioned in the interior space, and operationally engaged to the microprocessor to power the controller in event of a power outage, such that the video images are transmittable to the electronic device during the power outage, the battery being rechargeable;

a port attached to the housing and operationally engaged to the microprocessor; and a charging cord having a first plug complementary to the port, such that the first plug is selectively insertable into the port, a second plug of the charging cord being configured to engage a source of electrical current to recharge the battery; and programming code selectively positionable on the electronic device enabling the electronic device to receive and to selectively present a status of the garage door and the image captured by the camera, the programming code enabling wireless control of the garage door opener via the controller.

8. A camera equipped controller system comprising:

a garage;

a controller according to claim 1 being attached to a wall in the garage and wiredly engaged to a garage door opener for a garage door of the garage, the controller being configured for wireless communication, the controller comprising a manual switch and a camera, wherein the manual switch is configured to be switched to actuate the garage door and wherein the camera is configured to capture an image of a space defined by the garage; and an electronic device having positioned thereon programming code enabling the electronic device to receive and to selectively present a status of the garage door and the image captured by the camera, the programming code enabling wireless control of the garage door opener via the controller;

wherein the controller includes a housing defining an interior space;

a coupler attached to a rear of the housing and to the wall, such that the housing is attached to the wall, wherein the coupler is a pair of hangers, wherein each hanger of the pair of hangers is an L-shaped extension from the housing having a slotted distal flange relative to the housing wherein each hanger is configured to engage a head of a respective mounting screw extending from the wall;

a microprocessor attached to the housing and positioned in the interior space, the manual switch and the camera being attached to the housing and operationally engaged to the microprocessor, wherein the manual switch is configured to be switched to signal the microprocessor to actuate the garage door opener; and a set of connectors attached to the housing and operationally engaged to the microprocessor, the connectors of the set of connectors being wiredly engaged to the garage door opener; and a transceiver attached to the housing, positioned in the interior space, and operationally engaged to the microprocessor, the microprocessor being programmed to selectively actuate the garage door opener upon receipt of a signal from the electronic device to open and to close the garage door.

9. The camera equipped controller system of claim 8, wherein the manual switch is spring loaded and selectively depressible.

10. The camera equipped controller system of claim 8, wherein the camera is configured to capture video.

11. The camera equipped controller system of claim 8, wherein the set of connectors comprises a plurality of wire terminals.

12. The camera equipped controller system of claim 8, further including a battery attached to the housing, positioned in the interior space, and operationally engaged to the microprocessor to power the controller in event of a power outage, such that the video images are transmittable to the electronic device during the power outage.

13. The camera equipped controller system of claim 12, further including:

the battery being rechargeable;

a port attached to the housing and operationally engaged to the microprocessor; and a charging cord having a first plug complementary to the port, such that the first plug is selectively insertable into the port, a second plug of the charging cord being configured to engage a source of electrical current to recharge the battery.

* * * * *